(12) United States Patent
Yamamoto (10) Patent No.: US 8,817,361 B2
(45) Date of Patent: Aug. 26, 2014

(54) ELECTROPHORETIC PARTICLE, METHOD FOR PRODUCING ELECTROPHORETIC PARTICLE, ELECTROPHORETIC DISPERSION, ELECTROPHORETIC SHEET, ELECTROPHORETIC DEVICE, AND ELECTRONIC APPARATUS

(71) Applicant: Seiko Epson Corporation, Tokyo (JP)

(72) Inventor: Hitoshi Yamamoto, Chino (JP)

(73) Assignee: Seiko Epson Corporation, Tokyo (JP)

( * ) Notice: Subject to any disclaimer, the term of this patent is extended or adjusted under 35 U.S.C. 154(b) by 67 days.

(21) Appl. No.: 13/748,064

(22) Filed: Jan. 23, 2013

(65) Prior Publication Data

US 2013/0194655 A1 Aug. 1, 2013

(30) Foreign Application Priority Data

Jan. 27, 2012 (JP) ................. 2012-015881

(51) Int. Cl.
*G02F 1/00* (2006.01)
*G02F 1/167* (2006.01)
*C08F 2/44* (2006.01)

(52) U.S. Cl.
CPC ............... *G02F 1/0081* (2013.01); *C08F 2/44* (2013.01); *G02F 1/167* (2013.01); *G02F 2001/1678* (2013.01)
USPC ............................................. 359/296; 430/32

(58) Field of Classification Search
CPC ................. G02F 1/0081; G02F 1/167; G02F 2001/1678; C08F 2/44
USPC ................ 345/107; 359/296; 427/58; 430/32
See application file for complete search history.

(56) References Cited

U.S. PATENT DOCUMENTS

| | | | |
|---|---|---|---|
| 8,431,217 B2 * | 4/2013 | Gervasi et al. ................. 428/323 |
| 8,486,494 B2 * | 7/2013 | Fukazawa et al. .......... 427/385.5 |
| 2010/0302623 A1 | 12/2010 | Hosoya et al. | |
| 2012/0061608 A1 * | 3/2012 | Mitsunaga et al. ........ 252/62.54 |
| 2013/0265633 A1 * | 10/2013 | Yokokawa et al. ........... 359/296 |

FOREIGN PATENT DOCUMENTS

| | | |
|---|---|---|
| JP | A 2007-192945 | 8/2007 |
| JP | A 2008-233612 | 10/2008 |
| JP | A 2010-169784 | 8/2010 |
| JP | A 2010-262066 | 11/2010 |
| JP | A 2010-276782 | 12/2010 |
| JP | A 2011-170199 | 9/2011 |

* cited by examiner

*Primary Examiner* — David N Spector
(74) *Attorney, Agent, or Firm* — Oliff PLC (57) ABSTRACT

An electrophoretic particle includes a core particle and a coating layer covering at least one portion of the core particle. The coating layer contains a polymer and a silane coupling agent containing a nonionic charged group attached to the surface of the core particle. The polymer contains a silane coupling agent containing a polymerizable group attached to the surface of the core particle and a polymerization site formed by polymerizing a monomer using the polymerizable group as a starting point.

17 Claims, 7 Drawing Sheets

ELECTROPHORETIC PARTICLE, METHOD FOR PRODUCING ELECTROPHORETIC PARTICLE, ELECTROPHORETIC DISPERSION, ELECTROPHORETIC SHEET, ELECTROPHORETIC DEVICE, AND ELECTRONIC APPARATUS

BACKGROUND

1. Technical Field

The present invention relates to an electrophoretic particle, a method for producing an electrophoretic particle, an electrophoretic dispersion, an electrophoretic sheet, an electrophoretic device, and an electronic apparatus.

2. Related Art

In general, it is known that when an electric field is applied to a dispersion containing a liquid and fine particles dispersed therein, the fine particles move (electrophoretically migrate) in the liquid because of the Coulomb force. This phenomenon is referred to as electrophoresis. In recent years, electrophoretic displays, which display desired information (an image) using electrophoresis, have been attracting attention as novel displays.

The electrophoretic displays have advantages such as an image memory effect in the absence of voltage, a wide viewing angle, and the ability to display a high-contrast image at low power consumption.

The electrophoretic displays are non-emissive devices and therefore are gentler to eyes as compared with emissive display devices such as Braun tubes.

Such an electrophoretic display is known to include an electrophoretic dispersion which contains a solvent and electrophoretic particles dispersed therein and which is placed between a pair of substrates each having an electrode.

In the electrophoretic dispersion, the electrophoretic particles are those positively charged particles and those negatively charged. This allows desired information (an image) to be displayed when a voltage is applied between the substrates (electrodes) (refer to, for example, JP-A-2007-192945).

Positively charged electrophoretic particles are produced, for example, as described below.

First, particles are coated with a particulate metal oxide with a pH of more than 7, whereby base particles having a coating layer are prepared. The base particles are surface-grafted by various methods, whereby the positively charged electrophoretic particles are produced so as to have polymer molecules attached to the surfaces thereof.

Negatively charged electrophoretic particles can be produced in substantially the same manner as that used to produce the positively charged electrophoretic particles except that base particles having a coating layer are prepared using a particulate metal oxide with a pH of less than 7 instead of the particulate metal oxide with a pH of more than 7.

However, electrophoretic particles which are obtained as described above and which are positively or negatively charged tend to have a charge that depends on the density and molecular weight of the polymer molecules attached to the surfaces thereof.

That is, when the density of the attached polymer molecules is high, the charge of the electrophoretic particles tends to be low. In contrast, when the density of the attached polymer molecules is low, the charge of the electrophoretic particles tends to be high.

Therefore, in the case of increasing the density of the attached polymer molecules in consideration of the dispersibility of the electrophoretic particles in an electrophoretic dispersion, the charge of the electrophoretic particles is reduced; hence, there is a problem in that the mobility of the electrophoretic particles in the electrophoretic dispersion is low when a voltage is applied between a pair of electrodes.

SUMMARY

An advantage of some aspects of the invention is to provide an electrophoretic particle capable of exhibiting both excellent dispersibility and mobility in an electrophoretic dispersion, a method for producing an electrophoretic particle capable of exhibiting such functions, an electrophoretic dispersion which contains such electrophoretic particles and which has high reliability, an electrophoretic sheet which contains such electrophoretic particles and which has high reliability, an electrophoretic device which contains such electrophoretic particles and which has high reliability, and an electrophoretic apparatus which contains such electrophoretic particles and which has high reliability.

Such an advantage is achieved by the invention as described below.

An electrophoretic particle according to a first aspect of the invention includes a core particle and a coating layer covering at least one portion of the core particle. The coating layer contains a polymer and a silane coupling agent containing a nonionic charged group attached to the surface of the core particle. The polymer contains a silane coupling agent containing a polymerizable group attached to the surface of the core particle and a polymerization site formed by polymerizing a monomer using the polymerizable group as a starting point.

This allows the electrophoretic particle to exhibit both excellent dispersibility and mobility in an electrophoretic dispersion.

In the electrophoretic particle, the weight fraction of the coating layer in the electrophoretic particle is preferably 3% to 30% by weight.

This allows the electrophoretic particle to reliably exhibit an effect due to the presence of the coating layer and therefore allows the electrophoretic particle to exhibit both excellent dispersibility and mobility in an electrophoretic dispersion.

In the electrophoretic particle, the monomer is preferably hydrophobic.

This allows the dispersibility of the electrophoretic particle in a dispersion medium to be enhanced.

In the electrophoretic particle, the monomer preferably contains an alkyl group as a side chain.

This allows the monomer to reliably exhibit hydrophobicity.

In the electrophoretic particle, the alkyl group is preferably linear.

This allows the coating layer to exhibit excellent hydrophobicity and therefore allows the dispersibility of the electrophoretic particle in a dispersion medium to be enhanced.

In the electrophoretic particle, the monomer is preferably represented by the following formula:

wherein n represents an integer of 1 or more.

This allows the coating layer to exhibit excellent hydrophobicity and therefore allows the dispersibility of the electrophoretic particle in a dispersion medium to be enhanced.

In the electrophoretic particle, the nonionic charged group is preferably one positively charged.

This allows the electrophoretic particle to exhibit excellent mobility in an electrophoretic dispersion.

In the electrophoretic particle, the nonionic charged group is preferably one negatively charged.

This allows the electrophoretic particle to exhibit excellent mobility in an electrophoretic dispersion.

A method for producing an electrophoretic particle according to a second aspect of the invention, the electrophoretic particle including a core particle and a coating layer covering at least one portion of the core particle, includes a first step of preparing the core particle and attaching a silane coupling agent containing a polymerizable group and a silane coupling agent containing a nonionic charged group to the surface of the core particle and a second step of forming the coating layer on the core particle in such a manner that a polymerization site is formed by polymerizing a monomer using the polymerizable group as a starting point and a polymer is thereby obtained.

This allows the electrophoretic particle to be produced such that the electrophoretic particle exhibits both excellent dispersibility and mobility in an electrophoretic dispersion.

An electrophoretic dispersion according to a third aspect of the invention contains the electrophoretic particle according to the first aspect or an electrophoretic particle produced by the method according to the second aspect.

This allows the electrophoretic dispersion to contain an electrophoretic particle exhibiting both excellent dispersibility and mobility.

An electrophoretic sheet according to a fourth aspect of the invention includes a substrate and a plurality of structures which are placed above the substrate and which each contain the electrophoretic dispersion according to the invention.

This allows the electrophoretic sheet to have high reliably.

An electrophoretic device according to a fifth aspect of the invention includes the electrophoretic sheet according to the fourth aspect.

This allows the electrophoretic device to have high reliably.

An electrophoretic apparatus according to a sixth aspect of the invention includes the electrophoretic device according to the fifth aspect.

This allows the electrophoretic apparatus to have high reliably.

BRIEF DESCRIPTION OF THE DRAWINGS

The invention will be described with reference to the accompanying drawings, wherein like numbers reference like elements.

DESCRIPTION OF EXEMPLARY EMBODIMENTS

Preferred embodiments of the invention will now be described in detail with reference to the accompanying drawings.

First Embodiment

An electrophoretic particle 1 according to a first embodiment of the invention is described below.

Figure 1:
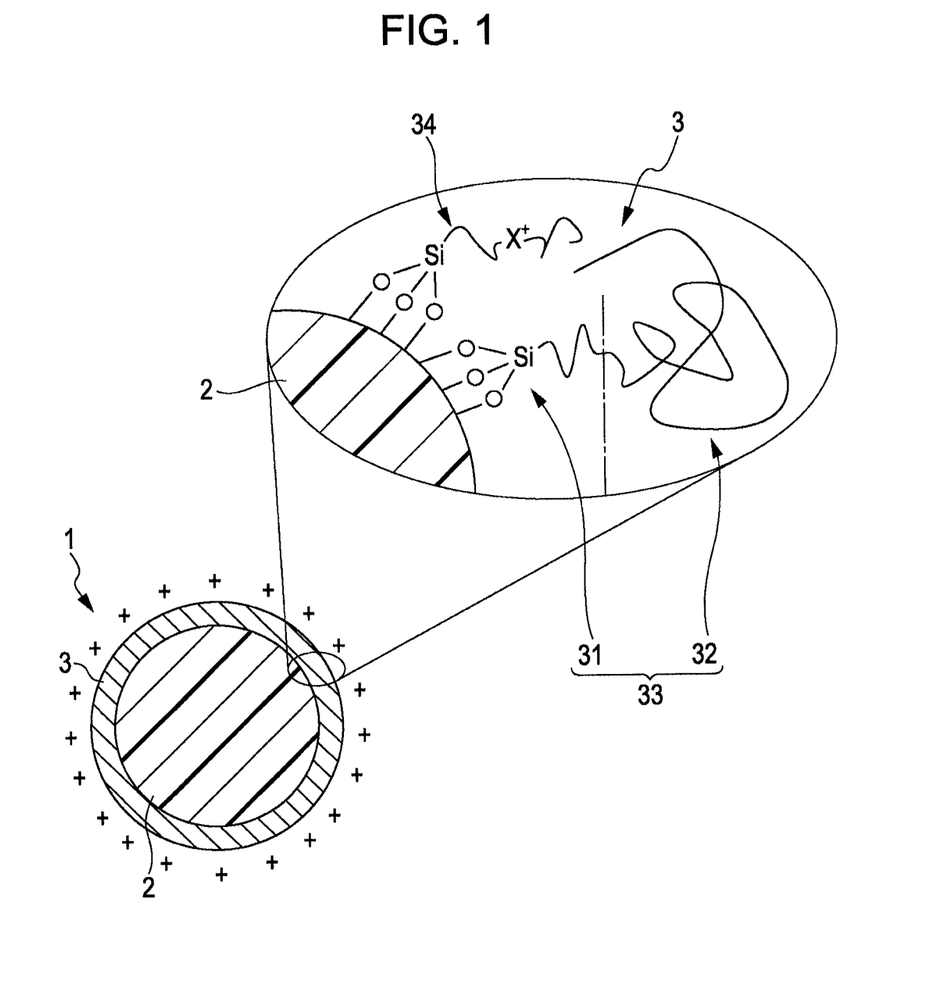
FIG. 1 is a vertical sectional view of an electrophoretic particle according to a first embodiment of the invention.

FIG. 1 is a vertical sectional view of the electrophoretic particle 1.

The electrophoretic particle 1 includes a core particle 2 and a coating layer 3 placed on the surface of the core particle 2. In this embodiment, a positively charged electrophoretic particle (positive electrophoretic particle) is described.

The core particle 2 is preferably at least one of a pigment particle, a resin particle, and a composite particle. These particles can be readily produced.

Examples of a pigment contained in the pigment particle include black pigments such as aniline black, carbon black, and titanium black; white pigments such as titanium dioxide, antimony trioxide, barium sulfate, zinc sulfide, hydrozincite, and silicon dioxide; azo pigments such as monoazo pigments, disazo pigments, and polyazo pigments; yellow pigments such as isoindolinone, chrome yellow, yellow oxide, cadmium yellow, titanium yellow, and antimony; red pigments such as quinacridone red and chromium vermilion; blue pigments such as phthalocyanine blue, indanthrene blue, iron blue, ultramarine blue, and cobalt blue; and green pigments such as phtalocyanine green. These pigments can be used alone or in combination.

Examples of a resin material contained in the resin particle include acrylic resins, urethane resins, urea resins, epoxy resins, polystyrenes, and polyesters. These resins can be used alone or in combination.

Examples of the composite particle include pigment particles coated with a resin material, resin particles coated with a pigment, and particles made of a mixture prepared by mixing a pigment and a resin material at an appropriate ratio.

The color of the electrophoretic particle 1 can be set as desired by appropriately selecting the type of the pigment particle, resin particle, or composite particle used as the core particle 2.

At least one portion (in the configuration shown in FIG. 1, substantially the whole) of the surface of the core particle 2 is covered with the coating layer 3.

In this embodiment, the coating layer 3 contains a polymer 33 and a silane coupling agent 34 containing a nonionic charged group X attached to the surface of the core particle 2. The polymer 33 contains a silane coupling agent 31 containing a polymerizable group attached to the surface of the core particle 2 and a polymerization site 32 formed by polymerizing a monomer using the polymerizable group as a starting point.

This allows the electrophoretic particles 1 to exhibit both excellent dispersibility and mobility in an electrophoretic dispersion below.

The polymer 33 contains the silane coupling agent 31, which contains the polymerizable group attached to the surface of the core particle 2, and the polymerization site 32, which is formed by polymerizing the monomer using the polymerizable group as a starting point, as described above.

The polymerization site 32 is one formed by the polymerization of a hydrophobic monomer and has a function of enhancing the dispersibility of the electrophoretic particle 1 in a dispersion medium below.

The monomer is hydrophobic, may have any configuration, and preferably contains a side chain with a hydrophobic group. This allows the monomer to reliably exhibit hydrophobicity.

The hydrophobic group is not particularly limited. Examples of the hydrophobic group include alkyl groups, aryl groups, and combinations thereof. In particular, the hydrophobic group is preferably an alkyl group, more preferably an alkyl group containing 6 to 24 carbon atoms, and further more preferably an alkyl group containing 8 to 18 carbon atoms. This allows the coating layer 3 to exhibit excellent hydrophobicity and therefore allows the electrophoretic particle 1 to exhibit enhanced dispersibility in the dispersion medium.

The hydrophobic group, which may be a branched alkyl group, is preferably a linear alkyl group. This reduces steric hindrance between neighboring hydrophobic groups and therefore allows the electrophoretic particle 1 to exhibit enhanced dispersibility in the dispersion medium.

The monomer contains a polymerizable group. Examples of the polymerizable group include groups, such as a vinyl group, a styryl group, and a (meth)acryloyl group, containing a carbon-carbon double bond and groups, such as a norbornyl group, an epoxy group, and an oxetanyl group, causing a ring-opening reaction. In terms of relatively high polymerization activity and low cost, the monomer preferably contains a styryl group or a (meth)acryloyl group.

An example of the monomer is one represented by, for example, the following formula:

wherein n represents an integer of 1 or more.

Since the polymerization site 32 is formed by the polymerization of the monomer as described above, the degree of hydrophobicity of the polymerization site 32 can be set as desired by setting the number of structural units derived from the monomer. In particular, the number of the structural units is preferably 300 or more and more preferably 600 or more. This allows the polymerization site 32 and therefore the electrophoretic particle 1 to exhibit excellent hydrophobicity.

The silane coupling agent 31, which contains the polymerizable group, is attached to the surface of the core particle 2 and is also attached to the polymerization site 32, which is formed by polymerizing the monomer using the polymerizable group as a starting point.

That is, the silane coupling agent 31, which contains the polymerizable group, functions as a junction connecting (linking) the core particle 2 to the polymerization site 32.

Examples of the polymerizable group, which is contained in the silane coupling agent 31, include groups, such as a vinyl group, a styryl group, and a (meth)acryloyl group, containing a carbon-carbon double bond.

When the polymerizable group is a vinyl group, examples of the silane coupling agent 31 include vinyltrimethoxysilane and vinyltriethoxysilane.

When the polymerizable group is a styryl group, an example of the silane coupling agent 31 is p-styryltrimethoxysilane.

When the polymerizable group is a (meth)acryloyl group, examples of the silane coupling agent 31 include 3-methacryloxypropylmethyldimethoxysilane, 3-methacryloxypropyltrimethoxysilane, 3-methacryloxypropyltriethoxysilane, and 3-acryloxypropyltrimethoxysilane.

The silane coupling agent 31, which contains the polymerizable group, may further contain a nonionic charged group X which is positively (plus) charged in addition to the polymerizable group. This allows the polymer 33 to have the same function as that of the silane coupling agent 34, which contains the nonionic charged group X, as described below.

When the silane coupling agent 31 contains the polymerizable group and the nonionic charged group X, examples of the silane coupling agent 31 include agents, such as N-(3-acryloxy-2-hydroxypropyl)-3-aminopropyltriethoxysilane, O-(methacryloxyethyl)-N-(triethoxysilylpropyl)urethane, and N-(3-methacryloxy-2-hydroxypropyl)-3-aminopropyltriethoxysilane, containing an amino group and a (meth)acryloyl group; agents, such as 3-(N-styrylmethyl-2-aminoethylamino)-propyltrimethoxysilane, containing an amino group and a styryl group; and agents, such as N-allyl-aza-2,2-dimethoxysilacyclopentane, containing an amino group and a vinyl group.

In this embodiment, the silane coupling agent 34 contains the nonionic charged group X, which is positively (plus) charged, and is attached to the surface of the core particle 2 to allow the electrophoretic particle 1 to be positively charged. Since the silane coupling agent 34 is contained in the coating layer 3, the electrophoretic particle 1 can exhibit excellent mobility in the electrophoretic dispersion.

Examples of the nonionic charged group X which is contained in the silane coupling agent 34 and which is positively (plus) charged include an amino group and a hydroxyl group.

When the nonionic charged group X which is positively charged is an amino group, examples of the silane coupling agent 34 include 3-aminopropyltriethoxysilane, 3-aminopropyltrimethoxysilane, aminophenyltrimethoxysilane, 3-aminopropyl-tris(methoxyethoxyethoxy)silane, 3-aminopropyldiisopropylethoxysilane, N-(2-aminoethyl)-3-aminopropyltriethoxysilane, N-(2-aminoethyl)-3-aminopropylmethyldiethoxysilane, n-butylaminopropyltrimethoxysilane, N-phenylaminopropyltrimethoxysilane, (N,N-diethyl-3-aminopropyl)trimethoxysilane, N,N-didecyl-N-methyl-N-(3-trimethoxysilylpropyl)ammonium chloride, bis(triethoxysilylpropyl)amine, and N-(3-triethoxysilylpropyl)-4,5-dihydroimidazole.

When the nonionic charged group X which is positively charged is a hydroxyl group, examples of the silane coupling agent 34 include bis(2-hydroxyethyl)-3-aminopropyltriethoxysilane and N-(3-triethoxysilylpropyl)gluconamide.

The weight fraction of the coating layer 3, which contains the polymer 33 and the silane coupling agent 34, in the electrophoretic particle 1 is 3% to 30% by weight, more preferably 5% to 20% by weight, further more preferably 7% to 15% by weight. This allows the electrophoretic particle 1 to reliably exhibit an effect due to the presence of the coating layer 3. Therefore, the electrophoretic particle 1 reliably exhibits both excellent dispersibility and mobility in the electrophoretic dispersion.

The electrophoretic particle 1 can be produced in, for example, a manner below.

A method for producing the electrophoretic particle 1 is described below.

Figure 2A:
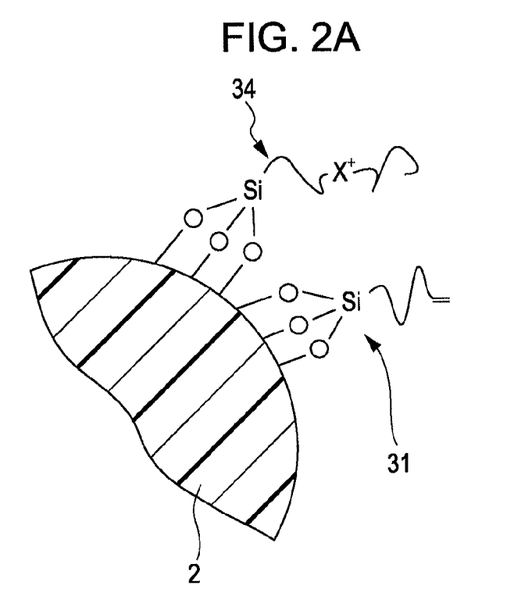
FIGS. 2A and 2B are schematic views illustrating a method for producing the electrophoretic particle shown in FIG. 1.
Figure 2B:
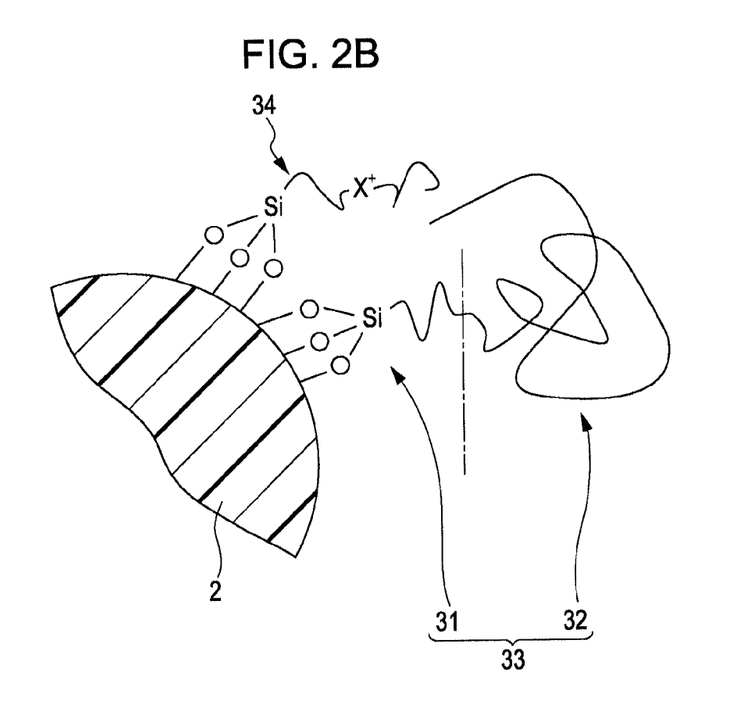

FIGS. 2A and 2B are schematic views illustrating the method for producing the electrophoretic particle 1, which is shown in FIG. 1.

The method for producing the electrophoretic particle 1 includes a first step of preparing the core particle 2 and attaching the silane coupling agent 31, which contains the polymerizable group, and the silane coupling agent 34, which contains the nonionic charged group X, to the surface of the core particle 2 and a second step of forming the coating layer 3 on the core particle 2 in such a manner that the polymerization site 32 is formed by polymerizing the monomer using the polymerizable group as a starting point and the polymer 33 is thereby obtained.

Each step is described below in detail.

(1) First, the core particle 2 is prepared and the silane coupling agent 31, which contains the polymerizable group, and the silane coupling agent 34, which contains the nonionic charged group X, are then attached to the surface of the core particle 2 as shown in FIG. 2A (the first step).

This step can be performed in such a manner that, for example, a solution containing the silane coupling agent 31, which contains the polymerizable group, and the silane coupling agent 34, which contains the nonionic charged group X, is prepared and the surface of the core particle 2 is contacted with the solution.

Examples of a process for contacting the surface of the core particle 2 with the solution include:

I. a process for dipping the core particle 2 in the solution (a dipping process),
II. a process for coating the surface of the core particle 2 with the solution (a coating process), and
III. a process for showering the surface of the core particle 2 with the solution (a spraying process).

Examples of a solvent used to prepare the solution include tetrahydrofuran, dichloromethane, water, methanol, ethanol, isopropyl alcohol, acetonitrile, ethyl acetate, ether, methylene chloride, and N-methyl-2-pyrrolidone (NMP). These compounds can be used alone or in combination.

In the case of using the dipping process, ultrasound may be applied to the solution for a predetermined time as required. This enhances the dispersibility of the core particle 2 in the solution; hence, the silane coupling agent 31, which contains the polymerizable group, and the silane coupling agent 34, which contains the nonionic charged group X, can be densely attached to the surface of the core particle 2.

In the solution, the mixing ratio of the silane coupling agent 31, which contains the polymerizable group, to the silane coupling agent 34, which contains the nonionic charged group X, is set depending on a positive charge applied to the electrophoretic particle 1. That is, a positive charge applied to the electrophoretic particle 1 can be controlled by adjusting the mixing ratio of the silane coupling agent 31 to the silane coupling agent 34.

Since the amount of a silane coupling agent attached to the surface of the core particle 2 is generally given by the following formula, the concentration of each of the silane coupling agents 31 and 34 in the solution is set such that such a relation is satisfied:

$$(13 \times 10^{-20}) \times (6.02 \times 10^{23})/(\text{the molecular weight of a silane coupling agent}) \, (\text{mm}^2/\text{g}) \quad (2)$$

(2) Next, as shown in FIG. 2B, the polymerization site 32 is formed by polymerizing the monomer using the polymerizable group, which is contained in the silane coupling agent 31, as a starting point and the polymer 33 is thereby obtained (the second step).

The polymerization site 32 can be obtained in such a manner that the monomer is subjected to, for example, living polymerization using the polymerizable group as a starting point and a polymer derived from the monomer is thereby synthesized.

Such living polymerization can be carried out in such a manner that the surface of the core particle 2 attached to the silane coupling agent 31, which contains the polymerizable group, is contacted with a solution containing the monomer and a catalyst.

The catalyst used is one allowing a growing end to act as a polymerizable group during the growth of the polymerization site 32 or one having relatively low Lewis acidity. Examples of the catalyst include halides of transition metals such as Cu, Fe, Au, Ag, Hg, Pd, Pt, Co, Mn, Ru, Mo, and Nb and transition metal complexes, such as copper phthalocyanine, coordinated with an organic compound acting as a ligand. In particular, the catalyst is preferably made of a halide of a transition metal.

Examples of a solvent used to prepare this solution include water; alcohols such as methanol, ethanol, and butanol; hydrocarbons such as hexane, octane, benzene, toluene, and xylene; ethers such as diethyl ether and tetrahydrofuran; and halogenated aromatic hydrocarbons such as chlorobenzene and o-dichlorobenzene. These compounds can be used alone or in combination.

The contact of this solution with the surface of the core particle attached to the silane coupling agent 31, which contains the polymerizable group, causes the polymerization of the polymerizable group with the polymerizable group of the monomer. During the growth of the polymerization site 32, a growing end always acts as the polymerizable group and the polymerizable group is polymerized with the polymerizable group of the monomer, whereby the polymer (polymeric compound) 33 is synthesized (produced).

In living polymerization, a growing end always has polymerization activity during the growth of a polymer. Therefore, after a monomer is consumed and polymerization is terminated, polymerization proceeds if the monomer is added.

Thus, the amount of the monomer supplied to a reaction system, the time of reaction, and the amount of the catalyst are adjusted depending on the desired degree of polymerization, whereby the number of the structural units, which are contained in the synthesized polymer 33 and are derived from the monomer, can be accurately controlled.

The polymer 33 has a uniform degree of polymerization and can be obtained as described above, which allows the formed coating layer 3 to have a relatively uniform thickness.

The polymer 33 has desired hydrophobicity and can be formed in a simple step with the variation of the electrophoretic particle 1 suppressed. This results in that the electrophoretic particle 1 exhibits excellent dispersibility in the electrophoretic dispersion.

This solution (reaction solution) is preferably deoxygenated prior to polymerization. Examples of deoxygenation include substitution and purging subsequent to vacuum deaeration using an inert gas such as argon or nitrogen.

The polymerization of the monomer can be quickly and reliably carried out in such a manner that this solution is heated (warmed) to a predetermined temperature (a temperature at which the monomer and the catalyst become active) prior to the polymerization thereof.

The heating temperature of this solution slightly varies depending on the type of the catalyst, is not particularly limited, and is preferably about 30° C. to 100° C. The heating time (reaction time) of this solution is preferably about 10 hours to 20 hours when the heating temperature thereof is within the above range.

As described above, the electrophoretic particle 1 is produced such that the core particle 2 is covered with the coating layer 3.

The electrophoretic particle 1 has excellent hydrophobicity due to the action of the polymer 33, which is contained in the coating layer 3, and therefore exhibits excellent dispersibility in the electrophoretic dispersion. Furthermore, the electrophoretic particle 1 includes the nonionic charged group X, which is positively charged due to the action of the silane coupling agent 34 contained in the coating layer 3, and therefore exhibits excellent mobility, in the electrophoretic dispersion.

Second Embodiment

An electrophoretic particle 1 according to a second embodiment of the invention is described below.

Figure 3:
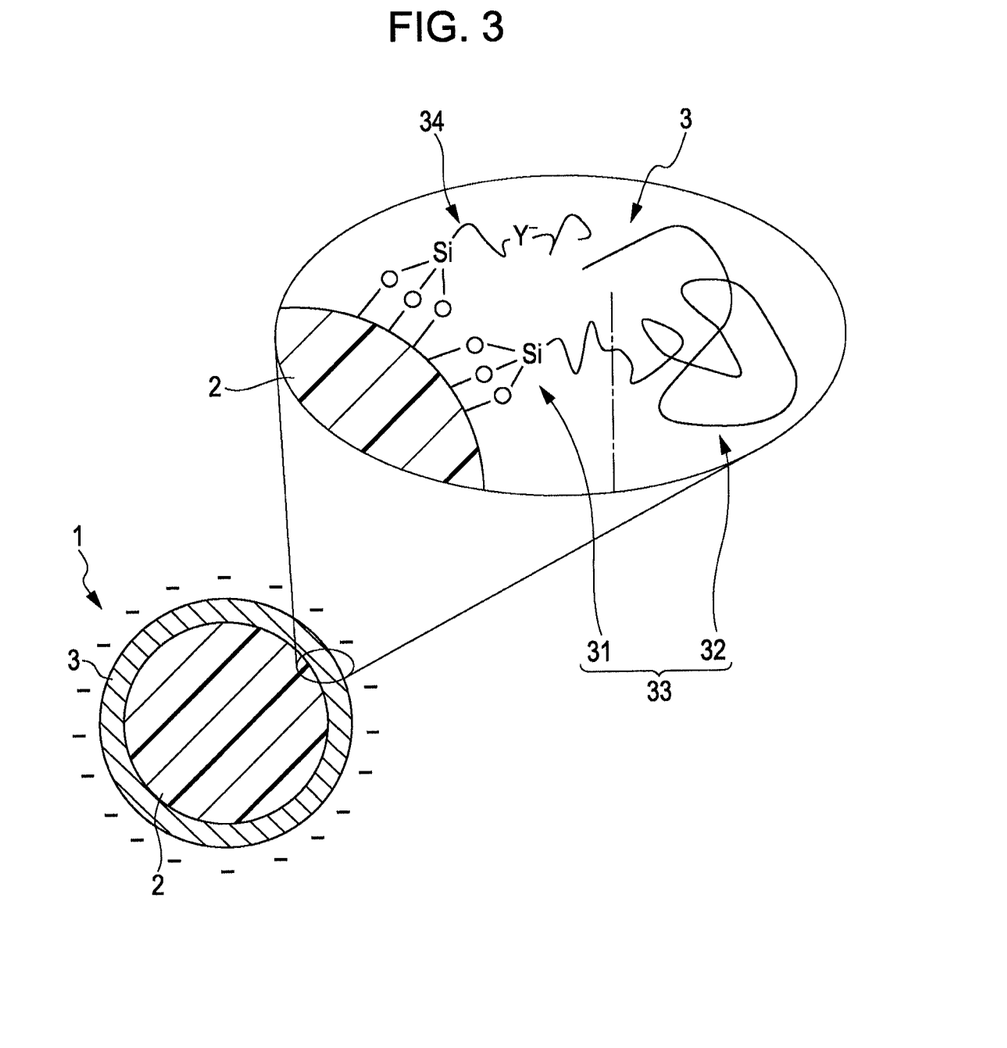
FIG. 3 is a vertical sectional view of an electrophoretic particle according to a second embodiment of the invention.

FIG. 3 is a vertical sectional view of the electrophoretic particle 1.

The second embodiment is described below with a focus on differences from the first embodiment and substantially the same items as those described in the first embodiment will not be described.

A silane coupling agent 34 used in the second embodiment is different in configuration from that used in the first embodiment and other members used in the second embodiment are substantially the same as those used in the first embodiment.

The silane coupling agent 34 contains a nonionic charged group Y which is negatively (minus) charged instead of the nonionic charged group X which is positively (plus) charged.

Therefore, in this embodiment, the electrophoretic particle 1 is a negatively charged electrophoretic particle (negative electrophoretic par'ticle).

Examples of the nonionic charged group Y, which is contained in the silane coupling agent 34 and is negatively charged, include a sulfonyl group, a halogen group, and an isocyanate group.

When the nonionic charged group Y, which is negatively charged, is a sulfonyl group, examples of the silane coupling agent 34 include 3-(trihydroxysilyl)-1-propanesulfonic acid and 2-(4-chlorosulfonylphenyl)ethyltrimethoxysilane.

When the nonionic charged group Y, which is negatively charged, is a halogen group, examples of the silane coupling agent 34 include ((chloromethyl)phenylethyl)trimethoxysilane, 3-chloropropyltriethoxysilane, 7-bromoheptyltrimethoxysilane, and 3-(trimethoxysilylpropyl)-2-bromo-2-methylpropionate.

When the nonionic charged group Y, which is negatively charged, is an isocyanate group, examples of the silane coupling agent 34 include 3-isocyanatepropyltriethoxysilane, tris(3-trimethoxysilylpropyl)isocyanurate, and (3-trimethoxysilylpropyl)-t-butylcarbamate.

The electrophoretic particle 1 according to this embodiment, as well as the electrophoretic particle 1 according to the first embodiment, has excellent hydrophobicity due to the action of a polymer 33 contained in a coating layer 3 and therefore exhibits excellent dispersibility in an electrophoretic dispersion below. Furthermore, the electrophoretic particle 1 according to this embodiment includes the nonionic charged group Y, which is negatively charged due to the action of the silane coupling agent 34 contained in the coating layer 3, and therefore exhibits excellent mobility in the electrophoretic dispersion.

Third Embodiment

An electrophoretic dispersion according to a third embodiment of the invention is described below.

The electrophoretic dispersion contains a dispersion medium (liquid dispersion medium) and at least one type of electrophoretic particles 1 (electrophoretic particles according to an embodiment of the invention) dispersed (suspended) therein.

A usual electrophoretic dispersion contains a dispersant and a surfactant for the purpose of enhancing the dispersibility of electrophoretic particles contained in the usual electrophoretic dispersion.

Since the dispersant and the surfactant are contained, there is a problem in that the change in temperature of the usual electrophoretic dispersion or the change in amount of water contained in the usual electrophoretic dispersion varies electrophoretic properties of these electrophoretic particles, the dispersibility of these electrophoretic particles, the display retainability of these electrophoretic particles, and other properties of these electrophoretic particles.

In this embodiment, the electrophoretic particles 1, which are contained in the electrophoretic dispersion, each includes a core particle 2 and a coating layer 3 formed thereon. The coating layer 3 contains a polymer 33 containing a silane coupling agent 31 containing a polymerizable group attached to the surface of the core particle 2 and a polymerization site 32 formed by polymerizing a monomer using the polymerizable group as a starting point and also contains a silane coupling agent 34 containing a nonionic charged group attached to the surface of the core particle 2.

The electrophoretic particles 1 have such a configuration and therefore have excellent hydrophobicity. Hence, the electrophoretic particles 1 can be dispersed in the electrophoretic dispersion without adding additives (organic polymers) such as a dispersant and a surfactant to the electrophoretic dispersion. Furthermore, the electrophoretic dispersion may contain no dispersant or surfactant and therefore various properties of the electrophoretic particles 1 can be reliably prevented from being varied due to the addition of such a dispersant and a surfactant.

The electrophoretic dispersion contains substantially no additive. In particular, the concentration of an organic polymer in the electrophoretic dispersion can be adjusted within the range of $1.0 \times 10^{-5}$% to $1.0 \times 10^{-3}$%. When the concentration thereof is within this range, it can be said that the electrophoretic dispersion contains substantially no dispersant or surfactant. Therefore, various properties of the electrophoretic particles 1 can be reliably prevented from being varied due to the addition of a dispersant and a surfactant.

The degree of hydrophobicity of the dispersion medium can be expressed by the dielectric constant of the dispersion medium. The dispersion medium preferably has a dielectric constant of 2.5 F/m to 10 F/m and more preferably 4.0 F/m to 7.0 F/m. When the dispersion medium has such a dielectric constant, it can be said that the dispersion medium has excellent hydrophobicity. Therefore, the electrophoretic particles 1 can be reliably dispersed in the electrophoretic dispersion.

The dispersion medium is preferably one of which the dielectric constant can be readily set within the above range and which has relatively high insulating performance. Examples of the dispersion medium include aprotic organic solvents such as aliphatic hydrocarbons (liquid paraffins), alicyclic hydrocarbons, aromatic hydrocarbons, halogenated hydrocarbons, and heteroaromatics. These solvents may be used alone or in combination.

The concentration of the organic polymer in the electrophoretic dispersion is preferably $1.0 \times 10^{-5}$% to $1.0 \times 10^{-3}$% and more preferably $1.0 \times 10^{-5}$% to $1.0 \times 10^{-4}$%. This allows various properties of the electrophoretic particles 1 to be reliably prevented from being varied.

The electrophoretic particles 1 can be dispersed in the dispersion medium by one of a paint shaker method, a ball mill method, a media mill method, an ultrasonic dispersion method, and an agitation dispersion method or a combination of two or more of these methods.

In the electrophoretic dispersion, the electrophoretic particles 1 exhibit excellent dispersibility and excellent mobility due to the action of the silane coupling agent 34, which is contained in the coating layer 3.

Fourth Embodiment

An electrophoretic display 920 (an electrophoretic device according to the invention) according to a fourth embodiment of the invention is described below.

Figure 4:
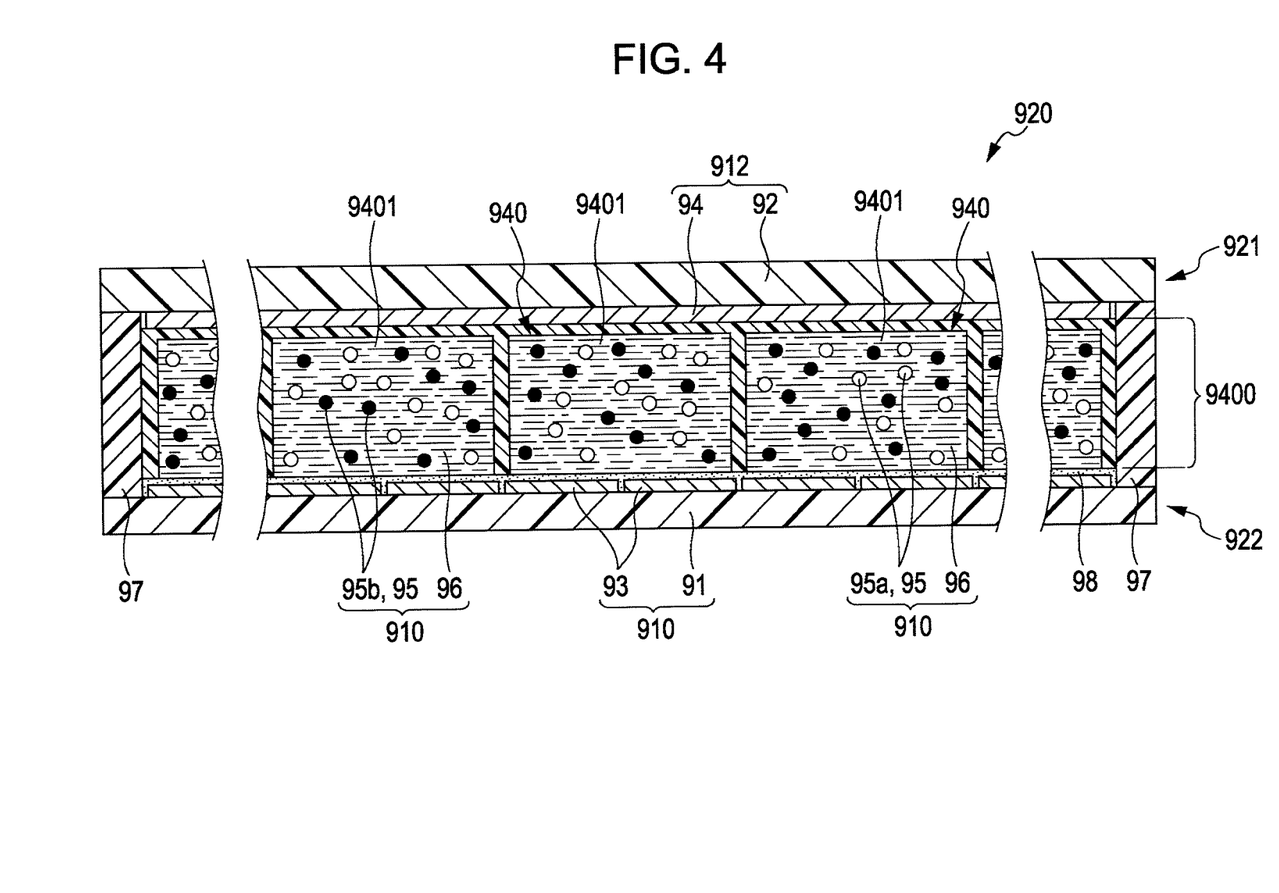
FIG. 4 is a schematic view of an electrophoretic display according to a fourth embodiment of the invention.
Figure 5A:
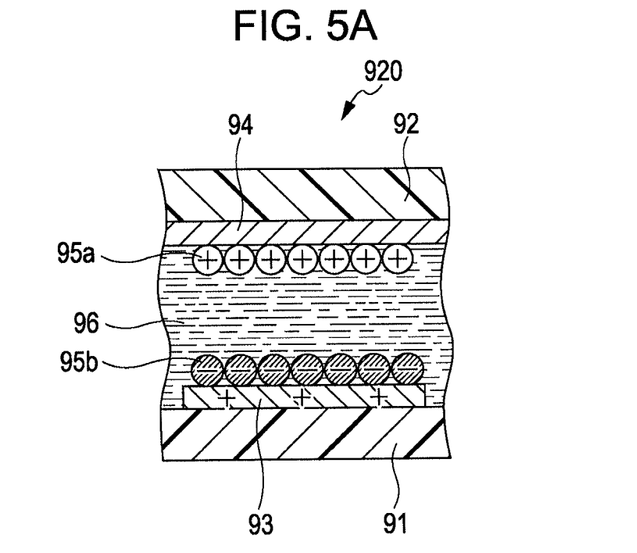
FIGS. 5A and 5B are schematic views illustrating the operating principle of the electrophoretic display shown in FIG. 4.
Figure 5B:
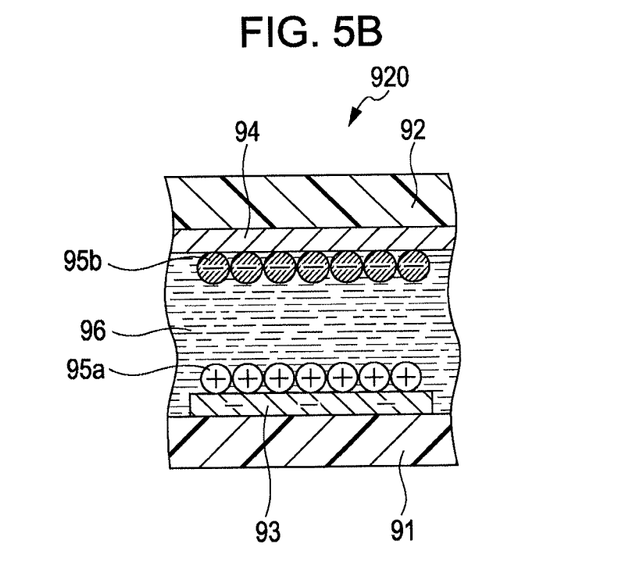

FIG. 4 is a schematic view of the electrophoretic display 920. FIGS. 5A and 5B are schematic views illustrating the operating principle of the electrophoretic display 920 shown in FIG. 4. For convenience of description, the upper side and lower side in each of FIGS. 4, 5A, and 5B are hereinafter expressed using the term "upper" and the term "lower", respectively.

With reference to FIG. 4, the electrophoretic display 920 includes an electrophoretic display sheet (front plane) 921, a circuit board (back plane) 922, an adhesive layer 98 bonding the electrophoretic display sheet 921 and the circuit board 922 together, and a sealing section 97 hermetically sealing a gap between the electrophoretic display sheet 921 and the circuit board 922.

The electrophoretic display sheet (an electrophoretic sheet according to the invention) 921 includes a substrate 912 including a tabular base portion 92 and a second electrode 94 placed on the lower surface of the base portion 92 and also includes a display layer 9400 which is placed on the lower surface (one surface) side of the substrate 912 and which includes separators 940 arranged in a matrix pattern and an electrophoretic dispersion 910.

The circuit board 922 includes a counter substrate 911 including a tabular base portion 91 and a plurality of first electrodes 93 placed on the upper surface of the base portion 91 and also includes a circuit (not shown) which is placed on the counter substrate 911 (the base portion 91) and which includes, for example, switching elements such as TFTs.

The configuration of each portion is described below.

The base portions 91 and 92 each include a sheet-shaped (tabular) member and have a function of supporting and protecting members placed therebetween.

The base portions 91 and 92 may be flexible or hard and are preferably flexible. When the base portions 91 and 92 are flexible, the electrophoretic display 920 is flexible and is useful in manufacturing, for example, an electronic paper.

When the base portions (base material layers) 91 and 92 are flexible, the base portions 91 and 92 are preferably made of a resin material.

The average thickness of the base portions 91 and 92 is appropriately set depending on a material used to form the base portions 91 and 92 or applications and is not particularly limited. The base portions 91 and 92 preferably have an average thickness of about 20 μm to 500 μm and more preferably about 25 μm to 250 μm.

The first electrodes 93 and the second electrode 94 are layered (filmy) and are placed on a surface of the base portion 91 that is located on the separators 940 side and a surface of the base portion 92 that is located on the separators 940 side, respectively, that is, the upper surface of the base portion 91 and the lower surface of the base portion 92, respectively.

When a voltage is applied between each first electrode 93 and the second electrode 94, an electric field is generated therebetween. The electric field acts on electrophoretic particles (electrophoretic particles according to the invention) 95.

In this embodiment, the second electrode 94 serves as a common electrode and the first electrodes 93 serve as individual electrodes (pixel electrodes connected to switching elements) arranged in a matrix pattern (an array). A crossover between the second electrode 94 and one of the first electrodes 93 corresponds to a pixel.

A material used to form the first electrodes 93 and a material used to form the second electrode 94 are not particularly limited and may be substantially conductive.

The average thickness of the first and second electrodes 93 and 94 is appropriately set depending on a material used to form each of the first and second electrodes 93 and 94 or applications and is not particularly limited. The first and second electrodes 93 and 94 preferably have an average thickness of about 0.05 μm to 10 μm and more preferably about 0.05 μm to 5 μm.

Some of the base portions 91 and 92 and the first and second electrodes 93 and 94 that are located on the screen side (in this embodiment, the base portion 92 and the second electrode 94) are light-transmissive, that is, substantially transparent (colorless, colored, or translucent).

In the electrophoretic display sheet 921, the display layer 9400 is placed on the lower surface of the second electrode 94.

The display layer 9400 has a configuration in which the electrophoretic dispersion (the above-mentioned electrophoretic dispersion according to the invention) 910 is stored (sealed) in a plurality of pixel spaces 9401 separated by the separators 940.

The separators 940 are arranged between the counter substrate 911 and the substrate 912 in a matrix pattern so as to be separated from each other.

Examples of a material used to form the separators 940 include resin materials such as thermoplastic resins including acrylic resins, urethane resins, and olefinic resins and thermosetting resins including epoxy resins, melamine resins, and phenol resins. These resins may be used alone or in combination.

In this embodiment, the electrophoretic dispersion 910, which is stored in the pixel spaces 9401, contains a dispersion medium 96 and two types of particles (at least one type of electrophoretic particles 1), that is, colored particles 95b and white particles 95a dispersed (suspended) in the dispersion medium 96 and corresponds to the above-mentioned electrophoretic dispersion according to the invention.

In the electrophoretic display 920, when voltages are applied between the first electrodes 93 and the second electrode 94, electric fields are generated therebetween and the colored particles 95b and the white particles 95a (electrophoretic particles 1) electrophoretically migrate toward the first electrodes 93 or the second electrode 94 in accordance with the electric fields.

In this embodiment, those having a positive charge are used as the white particles 95a and those having a negative charge are used as the colored particles (black particles) 95b. That is, electrophoretic particles 1 including positively charged core particles 2 are used as the white particles 95a and electrophoretic particles 1 including negatively charged core particles 2 are used as the colored particles 95b.

In the case of using such electrophoretic particles 1, when the first electrodes 93 have a positive potential, the white particles 95a migrate toward the second electrode 94 to gather at the second electrode 94 as shown in FIG. 5A. The colored particles 95b migrate toward the first electrodes 93 to gather at the first electrodes 93. Therefore, when the electrophoretic display 920 is viewed from above (from the screen side), the color of the white particles 95a is seen, that is, white is seen.

In contrast, when the first electrodes 93 have a negative potential, the white particles 95a migrate toward the first electrodes 93 to gather at the first electrodes 93 as shown in FIG. 5B. The colored particles 95b migrate toward the second electrode 94 to gather at the second electrode 94. Therefore, when the electrophoretic display 920 is viewed from above (from the screen side), the color of the colored particles 95b is seen, that is, black is seen.

In such a configuration, desired information (an image) is displayed on the screen side of the electrophoretic display 920 depending on a combination of the color of the white particles 95a and the color of the colored particles 95b, the number of particles gathering at the first electrodes 93 or the second electrode 94, or the like by appropriately setting the charge of the white particles 95a and the colored particles 95b (electrophoretic particles 1), the polarity of the first electrodes 93 or the second electrode 94, the difference in potential between each first electrode 93 and the second electrode 94, or the like.

The density of the electrophoretic particles 1 is preferably set to be equal to the density of the dispersion medium 96. This allows the electrophoretic particles 1 to remain at a certain position in the dispersion medium 96 for a long time even after the application of voltages between the first electrodes 93 and the second electrode 94 is stopped. That is, information displayed on the electrophoretic display 920 is retained for a long time.

The electrophoretic particles 1 preferably have an average size of about 0.1 μm to 10 μm and more preferably about 0.1 μm to 7.5 μm. The aggregation of the electrophoretic particles 1 and the precipitation of the electrophoretic particles 1 in the dispersion medium 96 can be reliably prevented by adjusting the average size of the electrophoretic particles 1 within the above range. This results in that the display quality of the electrophoretic display 920 can be reliably prevented from being deteriorated.

In this embodiment, the electrophoretic display sheet 921 and the circuit board 922 are bonded together with the adhesive layer 98 therebetween. This allows the electrophoretic display sheet 921 and the circuit board 922 to be reliably fixed.

The average thickness of the adhesive layer 98 is not particularly limited and is preferably about 1 to 30 μm and more preferably about 5 μm to 20 μm.

The sealing section 97 is placed between the base portions 91 and 92 and extends along the peripheries thereof. The sealing section 97 hermetically seals the first and second electrodes 93 and 94, the display layer 9400, and the adhesive layer 98. This prevents moisture from entering the electrophoretic display 920 and therefore allows the deterioration in display performance of the electrophoretic display 920 to be reliably prevented.

A material used to form the sealing section 97 may be the same as the material used to form the separators 940.

In this embodiment, the electrophoretic display sheet 921 is such a separator type that the display layer 9400 includes the separators 940, which are arranged in a matrix pattern, and the electrophoretic dispersion 910, which is filled in spaces separated by the separators 940. The electrophoretic display sheet 921 is not limited to such a configuration and may be, for example, such a microcapsule type that the display layer 9400 includes microcapsules containing the electrophoretic dispersion 910 and a binder for binding the microcapsules.

Fifth Embodiment

An electronic apparatus according to a fifth embodiment of the invention is described below.

The electronic apparatus includes the electrophoretic display 920 according to the fourth embodiment.

Electronic Paper

An example of the electronic apparatus is an electronic paper 600, which is described below.

Figure 6:
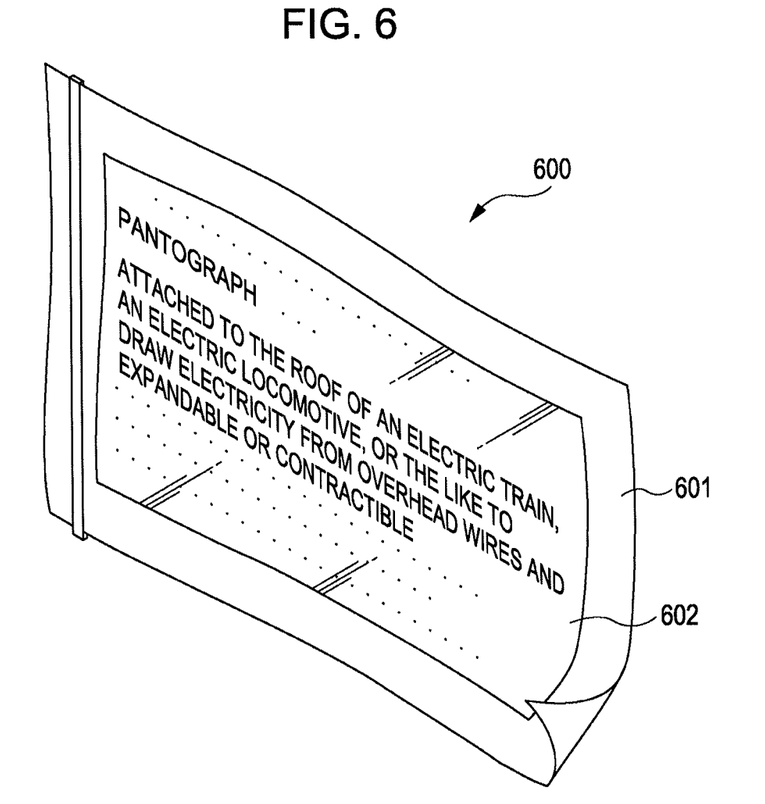
FIG. 6 is a perspective view of an electronic paper which is an example of an electronic apparatus according to a fifth embodiment of the invention.

FIG. 6 is a perspective view of the electronic paper 600.

With reference to FIG. 6, the electronic paper 600 includes a body 601 including a rewritable sheet which has the same texture as that of paper and which is flexible and also includes a display unit 602.

In the electronic paper 600, the display unit 602 includes the electrophoretic display 920.

Display

Another example of the electronic apparatus is a display 800, which is described below.

Figure 7A:
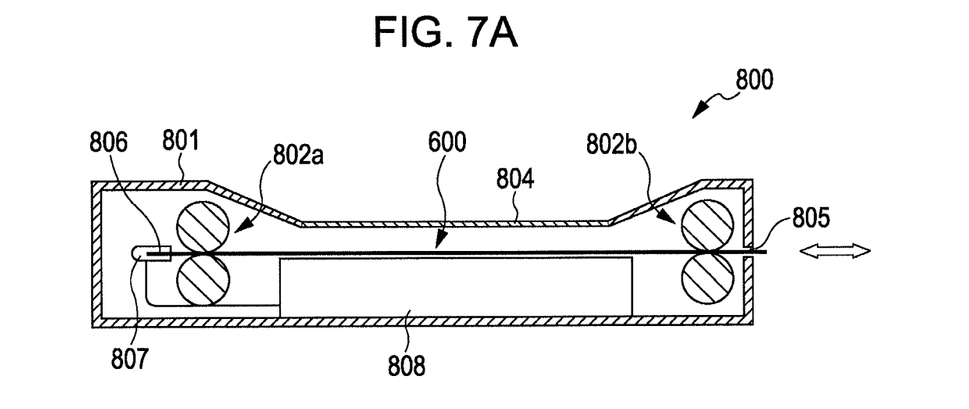
FIG. 7A is a sectional view of a display which is an example of the electronic apparatus according to the fifth embodiment.
Figure 7B:
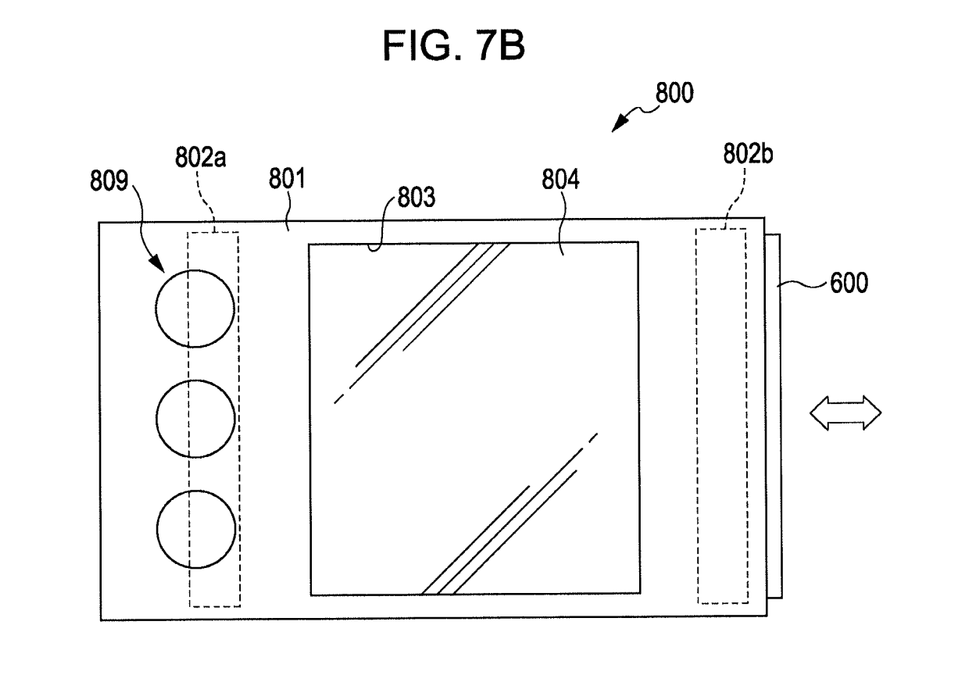
FIG. 7B is a plan view of the display shown in FIG. 7A.

FIG. 7A is a sectional view of the display 800. FIG. 7B is a plan view of the display 800.

With reference to FIGS. 7A and 7B, the display (display apparatus) 800 includes a body section 801 and the electronic paper 600. The electronic paper 600 is detachably attached to the body section 801.

The body section 801 includes a side portion (the right side in FIG. 7A) having an insertion slot 805 into which the electronic paper 600 is inserted and also includes two transport roller pairs 802a and 802b arranged in the body section 801. After the electronic paper 600 is inserted into the body section 801 through the insertion slot 805, the electronic paper 600 is set in the body section 801 in such a state that the electronic paper 600 is retained with the transport roller pairs 802a and 802b.

The body section 801 has a rectangular opening 803 located on the screen side (the front side in FIG. 7B) of the body section 801 and includes a transparent glass plate 804 fitted in the opening 803. This allows the electronic paper 600 placed in the body section 801 to be visually identified from outside the body section 801. That is, in the display 800, the screen is configured such that the electronic paper 600 placed in the body section 801 is visually identified through the transparent glass plate 804.

The body section 801 includes a terminal portion 806 located at the leading end in the insertion direction of the electronic paper 600 (on the left side in FIG. 7A) and also includes a socket 807 which is placed in the body section 801 and which is connected to the terminal portion 806 in such a state that the electronic paper 600 is placed in the body section 801. The socket 807 is electrically connected to a controller 808 and an operating portion 809.

In the display 800, the electronic paper 600 is detachably attached to the body section 801 and can be portably used in such a state that the electronic paper 600 is detached from the body section 801.

In the display 800, the electronic paper 600 includes the electrophoretic display 920.

The electronic apparatus is not limited to these examples. Other examples of the electronic apparatus include televisions, viewfinder-type video tape recorders, direct view-type video tape recorders, car navigation systems, pagers, electronic notebooks, portable electronic calculators, electronic newspapers, word processors, personal computers, work stations, video phones, point-of-sale (POS) terminals, and apparatuses equipped with touch panels. The electrophoretic display 920 can be applied to a display portion of each of these apparatuses.

While an electrophoretic particle, a method for producing an electrophoretic particle, an electrophoretic dispersion, an electrophoretic sheet, an electrophoretic device, and an electronic apparatus according to the invention have been described with reference to the accompanying drawings on the basis of embodiments, the invention is not limited to those described above. The configuration of each portion can be replaced with an arbitrary configuration having a similar function. An arbitrary constituent may be added to the invention.

One or more steps having an arbitrary purpose may be added to a method for producing an electrophoretic particle according to the invention.

The entire disclosure of Japanese Patent Application No. 2012-015881, filed Jan. 27, 2012 is expressly incorporated by reference herein.

What is claimed is:

1. An electrophoretic particle comprising:
    a core particle; and
    a coating layer covering at least one portion of the core particle, wherein the coating layer contains a polymer and a silane coupling agent containing a nonionic charged group attached to the surface of the core particle and the polymer contains a silane coupling agent containing a polymerizable group attached to the surface of the core particle and a polymerization site formed by polymerizing a monomer using the polymerizable group as a starting point.

2. The electrophoretic particle according to claim 1, wherein the nonionic charged group is one positively charged.

3. The electrophoretic particle according to claim 1, wherein the nonionic charged group is one negatively charged.

4. An electrophoretic dispersion containing the electrophoretic particle according to claim 1.

5. An electrophoretic sheet comprising:
    a substrate; and
    a plurality of structures which are placed above the substrate and which each contain the electrophoretic dispersion according to claim 4.

6. An electrophoretic device comprising the electrophoretic sheet according to claim 5.

7. An electronic apparatus comprising the electrophoretic device according to claim 6.

8. The electrophoretic particle according to claim 1, wherein the weight fraction of the coating layer in the electrophoretic particle is 3% to 30% by weight.

9. The electrophoretic particle according to claim 1, wherein the monomer is hydrophobic.

10. The electrophoretic particle according to claim 9, wherein the monomer contains an alkyl group as a side chain.

11. The electrophoretic particle according to claim 10, wherein the alkyl group is linear.

12. The electrophoretic particle according to claim 11, wherein the monomer is represented by the following formula:

wherein n represents an integer of 1 or more.

13. A method for producing an electrophoretic particle including a core particle and a coating layer covering at least one portion of the core particle, the method comprising:
    a first step of preparing the core particle and attaching a silane coupling agent containing a polymerizable group and a silane coupling agent containing a nonionic charged group to the surface of the core particle; and
    a second step of forming the coating layer on the core particle in such a manner that a polymerization site is formed by polymerizing a monomer using the polymerizable group as a starting point and a polymer is thereby obtained.

14. An electrophoretic dispersion containing an electrophoretic particle produced by the method according to claim 13.

15. An electrophoretic sheet comprising:
    a substrate; and
    a plurality of structures which are placed above the substrate and which each contain the electrophoretic dispersion according to claim 14.

16. An electrophoretic device comprising the electrophoretic sheet according to claim 15.

17. An electronic apparatus comprising the electrophoretic device according to claim 16.

* * * * *